US012162330B2

(12) United States Patent
Wilson et al.

(10) Patent No.: US 12,162,330 B2
(45) Date of Patent: Dec. 10, 2024

(54) MULTI-LAYER WINDSHIELD FILM HAVING PROGRESSIVE THICKNESS LAYERS

(71) Applicant: Racing Optics, Inc., Las Vegas, NV (US)

(72) Inventors: Stephen S. Wilson, Las Vegas, NV (US); Bart E. Wilson, Las Vegas, NV (US); Christophe Fremont, Las Vegas, NV (US)

(73) Assignee: RO Technologies, LLC, Las Vegas, NV (US)

( * ) Notice: Subject to any disclaimer, the term of this patent is extended or adjusted under 35 U.S.C. 154(b) by 0 days.

(21) Appl. No.: 17/937,371

(22) Filed: Sep. 30, 2022

(65) Prior Publication Data

US 2023/0249524 A1    Aug. 10, 2023

Related U.S. Application Data

(60) Provisional application No. 63/267,686, filed on Feb. 8, 2022.

(51) Int. Cl.
*B60J 1/20* (2006.01)
*B32B 7/12* (2006.01)
(Continued)

(52) U.S. Cl.
CPC ............. *B60J 1/2094* (2013.01); *B32B 7/12* (2013.01); *B32B 27/08* (2013.01); *B32B 27/36* (2013.01);
(Continued)

(58) Field of Classification Search
CPC ....... Y10T 428/24942; Y10T 428/2495; Y10T 428/24959; Y10T 428/24967;
(Continued)

(56) References Cited

U.S. PATENT DOCUMENTS

| 1,337,036 A | 4/1920 | Bergmann |
| 1,366,907 A | 2/1921 | Dunand |

(Continued)

FOREIGN PATENT DOCUMENTS

| AU | 2005244595 A1 | 7/2006 |
| AU | 2015277196 A1 | 1/2017 |

(Continued)

OTHER PUBLICATIONS www.wikipedia.org. "Black Body", Jul. 2009, 11 pages.

(Continued)

*Primary Examiner* — Maria V Ewald
*Assistant Examiner* — Ethan A. Utt
(74) *Attorney, Agent, or Firm* — Stetina Brunda Garred & Brucker (57) ABSTRACT

A protective barrier is affixable to a curved substrate such as a vehicle windshield. The protective barrier may include a stack of three or more lenses. Each of the three or more lenses may include a thermoplastic film (preferably a polyethylene terephthalate (PET) film) and an adhesive layer on a first side of the thermoplastic film. The three or more lenses may have respective thicknesses that define a monotonically decreasing function in a stacking direction of the stack and that include at least three different thicknesses. The protective barrier may be placed on the curved substrate with the adhesive layer of an innermost lens of the stack in contact with the curved substrate, and heat and pressure may be applied to conform the stack to the shape of the curved substrate. Thereafter, an outermost lens of the stack may be peeled off to reveal the next lens of the stack.

30 Claims, 2 Drawing Sheets (51) Int. Cl.
  *B32B 27/08* (2006.01)
  *B32B 27/36* (2006.01)
  *B32B 27/40* (2006.01)
  *B32B 37/10* (2006.01)
  *B32B 38/10* (2006.01)

(52) U.S. Cl.
  CPC .............. *B32B 27/40* (2013.01); *B32B 37/10* (2013.01); *B32B 38/10* (2013.01); *B32B 2250/03* (2013.01); *B32B 2250/24* (2013.01); *B32B 2307/732* (2013.01); *B32B 2605/006* (2013.01)

(58) Field of Classification Search
  CPC .............. Y10T 428/26; Y10T 428/266; Y10T 428/269; Y10T 428/28; Y10T 428/2848; Y10T 428/2852; Y10T 428/2878; Y10T 428/2891; Y10T 428/2896; Y10T 428/31551; Y10T 428/31554; Y10T 428/31565; Y10T 428/31573; Y10T 428/31598; Y10T 428/31663; Y10T 428/31667; Y10T 428/31786; Y10T 428/31797; Y10T 428/31855; Y10T 428/31909; Y10T 428/31928; Y10T 428/31935; Y10T 428/31601; Y10T 428/31507; Y10T 428/31616; Y10T 428/31645; Y10T 428/31649; B32B 7/02; B32B 7/04; B32B 7/06; B32B 7/12; B32B 27/00; B32B 27/04; B32B 27/06; B32B 27/08; B32B 27/30; B32B 27/308; B32B 27/36; B32B 27/40; B32B 2307/40; B32B 2307/412; B32B 2307/418; B32B 2307/50; B32B 2307/514; B32B 2307/518; B32B 2307/716; B32B 2307/7163; B32B 2307/732; B32B 2307/748; B32B 2405/00; B32B 2605/00; B32B 2605/006; B32B 2605/08; B32B 27/365; B32B 17/00; B32B 17/06; B32B 17/10; B32B 17/10005; B60J 1/00; B60J 1/001; B60J 1/02; B60J 1/20; B60J 1/2094; G02B 1/00; G02B 1/04; G02B 1/041; G02B 3/00; G02B 3/02
  USPC ....... 428/212–215, 220, 332, 337, 339, 343, 428/354, 355 R, 355 RA, 355 EN, 428/355 AC, 355 N, 423.1, 423.3, 423.7, 428/424.2, 425.5, 446, 447, 448, 451, 428/480, 483, 500, 515, 520, 522, 412, 428/425.6, 426, 428, 429, 430, 441, 442; 296/77.1, 84.1, 90, 96.12; 359/642, 796, 359/797
  See application file for complete search history.

(56) References Cited

U.S. PATENT DOCUMENTS

| | | |
|---|---|---|
| 2,138,086 A | 11/1938 | Blodjer |
| 2,248,331 A | 7/1941 | Blodjer |
| 2,328,687 A | 9/1943 | Serr |
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Morgan |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | William |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A * | 3/1990 | Corbo ............... E06B 3/285 428/354 |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Spicer et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,067,475 A | 11/1991 | Posnansky |
| 5,071,206 A | 12/1991 | Hood et al. |
| H1023 H | 3/1992 | Wiseman |

(56) References Cited

U.S. PATENT DOCUMENTS

| | | |
|---|---|---|
| 5,104,929 A | 4/1992 | Bilkadi |
| 5,113,528 A | 5/1992 | Burke, Jr. et al. |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,471,036 A | 11/1995 | Sperbeck |
| 5,473,778 A | 12/1995 | Bell |
| 5,486,883 A | 1/1996 | Candido |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Hartmut et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,750,922 B1 | 6/2004 | Benning |
| 6,773,778 B2 | 8/2004 | Onozawa et al. |
| 6,773,816 B2 | 8/2004 | Tsutsumi |
| 6,777,055 B2 | 8/2004 | Janssen et al. |
| 6,800,378 B2 | 10/2004 | Hawa et al. |
| 6,838,610 B2 | 1/2005 | De Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,995,976 B2 | 2/2006 | Richardson |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,597,441 B1 | 10/2009 | Farwig |
| 7,629,052 B2 | 12/2009 | Brumwell |
| 7,631,365 B1 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B1 | 9/2011 | Davenport |
| 8,044,942 B1 | 10/2011 | Leonhard et al. |

(56) References Cited

U.S. PATENT DOCUMENTS

| | | |
|---|---|---|
| 8,261,375 B1 | 9/2012 | Reaux |
| 8,292,347 B1 * | 10/2012 | Drake .................. B60J 1/2094 |
| | | 160/370.21 |
| 8,294,843 B2 | 10/2012 | Hollaway |
| 8,361,260 B2 | 1/2013 | Wilson et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,889,801 B2 | 11/2014 | Liao et al. |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 * | 9/2016 | Hines ..................... G06F 3/00 |
| 9,471,163 B2 | 10/2016 | Wilson et al. |
| 9,526,290 B2 | 12/2016 | Wilson |
| 9,575,231 B2 | 2/2017 | Chu et al. |
| D781,507 S | 3/2017 | Huh |
| D781,508 S | 3/2017 | Huh |
| 9,629,407 B2 | 4/2017 | Foster |
| 9,671,622 B1 | 6/2017 | Vetrini et al. |
| 9,726,940 B2 | 8/2017 | Tomiyasu |
| D805,256 S | 12/2017 | Yang |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,226,095 B2 | 3/2019 | Wilson |
| 10,227,501 B2 | 3/2019 | Hwang et al. |
| D849,240 S | 5/2019 | Guo et al. |
| D850,256 S | 6/2019 | Ryszawy |
| 10,321,731 B2 | 6/2019 | Wilson |
| 10,345,934 B2 | 7/2019 | Wilson et al. |
| 10,427,385 B2 | 10/2019 | Wilson et al. |
| 10,520,756 B2 | 12/2019 | Gallina et al. |
| D879,384 S | 3/2020 | Sato |
| D882,182 S | 4/2020 | Fekete |
| 10,620,670 B2 | 4/2020 | Wilson et al. |
| 10,687,569 B1 | 6/2020 | Mcdirmid |
| 10,716,986 B2 | 7/2020 | Winter et al. |
| D907,299 S | 1/2021 | Brown, II et al. |
| D907,300 S | 1/2021 | Brown, II et al. |
| D925,129 S | 7/2021 | Wilson |
| D925,834 S | 7/2021 | Babin et al. |
| 11,141,959 B2 | 10/2021 | Wilson et al. |
| 11,147,323 B1 | 10/2021 | Wilson |
| 11,307,329 B1 | 4/2022 | Wilson |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0133035 A1 | 6/2005 | Yahiaoui et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0231979 A1 | 9/2008 | Chen |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | Mcintyre |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |

(56) References Cited

U.S. PATENT DOCUMENTS

| | | |
|---|---|---|
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0180204 A1 | 7/2012 | Hawkins |
| 2012/0183712 A1 | 7/2012 | Leonhard et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0089688 A1 | 4/2013 | Wilson et al. |
| 2013/0141693 A1 | 6/2013 | McCabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2015/0033431 A1 | 2/2015 | Hofer Kraner et al. |
| 2015/0131047 A1 | 5/2015 | Saylor et al. |
| 2015/0234209 A1 | 8/2015 | Miyamoto et al. |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0236753 A1 | 8/2018 | Wykoff, II et al. |
| 2018/0295925 A1 | 10/2018 | Gagliardo et al. |
| 2018/0338550 A1 | 11/2018 | Boulware et al. |
| 2019/0021430 A1 | 1/2019 | Elliott |
| 2019/0037948 A1 | 2/2019 | Romanski et al. |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0154808 A1 | 5/2020 | Inouye |
| 2020/0178622 A1 | 6/2020 | Jascomb et al. |
| 2020/0281301 A1 | 9/2020 | Wynalda, Jr. |
| 2020/0310494 A1* | 10/2020 | Ahn ................ B32B 17/10 |
| 2021/0030095 A1 | 2/2021 | Reicher |
| 2021/0298380 A1 | 9/2021 | Brown, II et al. |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2022/0015472 A1 | 1/2022 | Boza |
| 2023/0106407 A1* | 4/2023 | Arima ................ C09D 175/04 |
| | | 428/35.8 |

FOREIGN PATENT DOCUMENTS

| | | | |
|---|---|---|---|
| DE | 3637188 A1 | 5/1988 | |
| DE | 19808535 A1 | 9/1999 | |
| DE | 202004010014 U1 | 4/2005 | |
| DE | 202020101562 U1 | 4/2020 | |
| DE | 202020101794 U1 | 4/2020 | |
| EP | 192075 A2 | 8/1986 | |
| EP | 671258 A2 | 9/1995 | |
| EP | 1471415 A2 | 10/2004 | |
| EP | 3157480 A1 | 4/2017 | |
| GB | 2310862 A | 9/1997 | |
| JP | 61017860 A | 1/1986 | |
| JP | S6117860 A | 1/1986 | |
| JP | 62053832 A | 3/1987 | |
| JP | 04314537 A | 11/1992 | |
| JP | 06143496 A | 5/1994 | |
| JP | 07021456 A | 1/1995 | |
| JP | 10167765 A | 6/1998 | |
| JP | 2002328613 A | 11/2002 | |
| JP | 2012183822 A | 9/2012 | |
| JP | 2014032222 A | 2/2014 | |
| JP | 2015128896 A | 7/2015 | |
| JP | 6767596 B1 * | 10/2020 | ............. B32B 27/08 |
| KR | 20120001292 A | 1/2012 | |
| TW | 200700793 A | 1/2007 | |
| TW | 201027992 A | 7/2010 | |
| WO | 0024576 A1 | 5/2000 | |
| WO | 03052678 A1 | 6/2003 | |
| WO | 2015009114 A1 | 1/2015 | |
| WO | 2015091425 A1 | 6/2015 | |
| WO | 2015093413 A1 | 6/2015 | |
| WO | 2015195814 A1 | 12/2015 | |
| WO | 2019006151 A1 | 1/2019 | |
| WO | 2019055267 A1 | 3/2019 | |
| WO | WO-2021176316 A1 * | 9/2021 | ............. B29C 48/21 |

OTHER PUBLICATIONS www.wikipedia.org. "Infrared", Jul. 2009, 12 pages.
www.wikipedia.org. "PET Film (biaxially oriented)", Jul. 2009, 4 pages.
PCT International Application No. PCT/US99/25128 with International Search Report, Date of Completion Jan. 18, 2000, 54 Pages.
English translation of TW201027992, "Monitor Protection Device for a Flat Panel Display", 11 pgs.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US20/24639, Jun. 11, 2020, 13 pages.
PCT International Search Report and Written Opinion for International Application No. PCT/US2020/049919; Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.
PCT International Search Report and Written Opinion for International Application No. PCT/US2020/062230; Feb. 3, 2021.
"Anti-reflective coating," Wikipedia, last updated Jul. 13, 2017 by Andy Dingley, <https://en.m.wikipedia.org/wiki/Anti-reflective_coating>.
"Monotonic function," Wikipedia, accessed May 24, 2017, <https://en.wikipedia.org/wiki/Monotonic_function>.
"Thin Film," Wikipedia, last updated Jun. 20, 2017, <https://en.wikipedia.org/wiki/Thin_film>.
"Tips to Get Quality Anti-Reflection Optical Coatings," Penn Optical Coatings, accessed May 24, 2017, <http://www.pennoc.com/tipsgetqualityantireflectionopticalcoatings/>.

(56) References Cited

OTHER PUBLICATIONS

Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxIC&lpg=PA339&dq=AR%20thick%20film%20coatings&pg=PA339#v=onepage&q=AR%20thick%20film%20coatings&f=false>.

Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.

MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.

Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.

PCT International Search Report and Written Opinion for International Application No. PCT/US2017/044438, dated Oct. 23, 2017, 12 pages.

Chemical Book, "Benzophenone", https://www.chemicalbook.com/Chemical ProductProperty_EN_CB57 44679.htm, available at least as of 2017, accessed on line on Dec. 15, 2021 (Year: 2017).

Chemical Book, "Polymethylhydrosiloxane", https://www.chemicalbook.com/Chemical ProductProperty_EN_ CB3694969. htm, available at least as of 2017, accessed online on Dec. 15, 2021 (Year: 2017).

Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).

Hostaphan RBB biaxially oriented film data sheet (Year: 2011).

PCT International Search Report and Written Opinion for International Application No. PCT/US2020/024639; Jun. 11, 2020.

PCT International Search Report and Written Opinion for International Application No. PCT/US2021/026165, dated Jul. 9, 2021, 10 pages.

PCT International Search Report and Written Opinion for International Application No. PCT/US21/20421, May 20, 2021, 8 pages.

Wiseman, Sr., United States Statutory Invention Registration No. H1023, published Mar. 3, 1992, 7 pages.

Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).

Pearson Dental, "UV Protection Face Shields", https://www.pearsondental.com/catalog/subcat_thumb.asp?majcatid=750&catid=10149, available online at least as of Jan. 27, 2021 per Internet Archive, accessed online on Sep. 15, 2021. (Year: 2021).

Patent Cooperation Treaty, International Search Report and Written Opinion for International Application No. PCT/US2022/031823, mailed Jul. 14, 2022, 11 pages.

*Racing Optics, Inc.* v. *Aevoe Corp. dba Moshi*; Case 2:15-cv-01774-RCJ-VCF; "Answer to Aevoe's Counterclaims—Jury Trial Demanded"; Nov. 2, 2015; 15 pages.

Gregory Brower et al.; "Complaint for Patent Infringement"; Sep. 15, 2015; 15 pages.

Jeffrey A. Silverstri et al.; "Answer to Complaint for Patent Infringement"; Oct. 7, 2015; 59 pages.

United States Patent and Trademark Office; Office Action for U.S. Appl. No. 15/090,681; Aug. 26, 2016; 8 pages.

List of References for U.S. Appl. No. 15/090,681; Receipt date Jun. 30, 2016; 3 pages.

List of References for U.S. Appl. No. 15/090,681; Receipt date Apr. 27, 2016; 4 pages.

Examiner's search strategy and results for U.S. Appl. No. 15/090,681; Aug. 21, 2016; 2 pages.

*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.

Exhibit 1—Invalidity Contentions re: '545 Patent Under LPR 1-8(b)-(d); at least as early as Jul. 1, 2016.

Exhibit 2—Invalidity Contentions re: '256 Patent Under LPR 1-8(b)-(d); at least as early as Jul. 1, 2016.

Exhibit 3—Invalidity Contentions re: '620 Patent Under LPR 1-8(b)-(d); at least as early as Jul. 1, 2016.

Exhibit 4—Invalidity Contentions re: '625 Patent Under LPR 1-8(b)-(d); at least as early as Jul. 1, 2016.

Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.

Exhibit 1004—U.S. Pat. No. 7,351,470 to Draheim et al; Case IPR2016-01745; Inter Partes Review of U.S. Pat. No. 8,974,620; at least as early as Sep. 7, 2016; pp. 1-15.

Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.

Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.

Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.

Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.

Exhibit 1006—Japanese Application No. JP 2002-328613 to Kitaguchi Translation; IPR2016-01745; at least as early as Sep. 7, 2016; pp. 1-10.

Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.

Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.

*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.

*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.

Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.

Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.

*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.

*Aevoe Corp.* v. *Racing Optics, Inc.*;Power of Attorney; Case IPR2016-01745; Inter Partes Review of U.S. Pat. No. 8,974,620; at least as early as Sep. 7, 2016; pp. 1-4.

*Aevoe Corp.* v. *Racing Optics, Inc.*; Notice of Filing Date; Case IPR2016-01745; Inter Partes Review of U.S. Pat. No. 8,974,620; at least as early as Sep. 6, 2016; p. 1-5.

(56) References Cited

OTHER PUBLICATIONS

*Aevoe Corp.* v. *Racing Optics, Inc.*; Decision; Case IPR2016-01164; Inter Partes Review of U.S. Pat. No. 9,104,256; at least as early as Nov. 7, 2016; p. 1-24.
*Aevoe Corp.* v. *Racing Optics, Inc.*; Decision; Case IPR2016-01166; Inter Partes Review of U.S. Pat. No. 9,274,625; at least as early as Nov. 7, 2016; p. 1-23.
*Aevoe Corp.* v. *Racing Optics, Inc.*; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; Jul. 8, 2020.
Prosecution History of U.S. Re-Examination Application No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc.* v. *Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.
https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield For Masses, Apr. 15, 2020, 3 pages.
Tom Zillich, Surrey manufacturer hopes to hit home run with face shield that clips to baseball cap, Apr. 29, 2020, 3 pages.
Opentip, Opromo Safety Face Shield Visor for Adult Kids, Protective Cotton Hat with Removable PVC Face Cover <https://www.opentip.com/product.php?products_id=11699030>, May 5, 2020, 3 pages.
Hefute, Hefute 5 PCS Protective Face Cover with Shield Comfortable Full Protection Face Compatible with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-7e1-4b8b-9d02-4bd86f5158c5&pd_rd_wg=pxuOs&pf_rd_r=PNDA%E2%80%A6>, May 5, 2020, 8 pages.
Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.
Hatshield, Shield Yourself With The Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Eli N. Perencevich, Moving Personal Protective Equipment Into the Community Face Shields and Containment of COVID-19, Apr. 29, 2020, 2 pages.
Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook"; Oct. 2016.
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.

(56) References Cited

OTHER PUBLICATIONS

PCT Search Report & Written Opinion for PCT/US2019/054565 (Dec. 20, 2019).
PCT Search Report & Written Opinion for PCT/US2015/036248 (Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
International Search Report; International Application No. PCT/US03/16284; Date of Completion: Mar. 9, 2004; 3 pages.
European Search Report for Application No. 15809930.9-107 / 3157480 (Dec. 15, 2017).
Canadian Office Action for Application Serial No. 2,952,436 (Nov. 15, 2019).
Canadian Office Action for Application Serial No. 2,952,436 (May 3, 2019).
Australian Examination Report for Application Serial No. 2015277196 (Oct. 18, 2018).
www.wikipedia.org, Refractive Index, Oct. 31, 2014.

* cited by examiner

MULTI-LAYER WINDSHIELD FILM HAVING PROGRESSIVE THICKNESS LAYERS

CROSS-REFERENCE TO RELATED APPLICATIONS

This application relates to and claims the benefit of U.S. Provisional Application No. 63/267,686, filed Feb. 8, 2022 and entitled "MULTI-LAYER WINDSHIELD FILM HAVING PROGRESSIVE THICKNESS LAYERS," the entire contents of which is expressly incorporated by reference.

STATEMENT RE: FEDERALLY SPONSORED RESEARCH/DEVELOPMENT

Not Applicable

BACKGROUND

For participants in motorsports such as stock car racing and off-road racing, it is important to maintain visibility of the course as mud, bugs, and other debris accumulate on the windshield of the vehicle and as the windshield becomes pitted by hard debris such as rocks. The same is true, though on a more gradual scale, for ordinary street vehicles. In addition, auto racers and ordinary street vehicle owners alike have a need to protect the underlying windshield from pitting or cracking in view of the high expense and inconvenience of replacing it. Indeed, this aspect of the problem is even more pronounced in the case of street vehicles due to the much greater number of street vehicles in existence and the higher cost of glass windshields in comparison to polycarbonate windshields as are typically used in racecars. To meet these needs, tearoff films are commonly employed, either individually or in laminated stacks, which may be applied to any type of vehicle windshield. As debris accumulates on the outermost tearoff film, or as the outermost film becomes pitted and otherwise damaged, the driver simply tears it off to reveal the next pristine film underneath. Depending on the number of films in the stack, the process may be repeated several times before replacing the stack.

It has been found by the present inventors that much of the protective benefit of a laminated stack of tearoff films comes from its total thickness as it serves to cushion the impact of hard debris. Unfortunately, this potential benefit is at odds with its functionality as a laminated stack since each removed film dramatically reduces the thickness of the stack, resulting in a reduced resistance to impact and a significantly increased likelihood that the underlying windshield will become damaged by debris while the stack is in use. Moreover, there is a performance tradeoff between the impact cushioning effect and the increased distortion associated with the use of relatively thicker films.

BRIEF SUMMARY

The present disclosure contemplates various systems and methods for overcoming the above drawbacks accompanying the related art. One aspect of the embodiments of the present disclosure is a protective barrier affixable to a curved substrate. The protective barrier may comprise a stack of three or more lenses. Each of the three or more lenses may include a thermoplastic film (preferably a polyethylene terephthalate (PET) film or a thermoplastic polyurethane (TPU) film) and an adhesive layer on a first side of the thermoplastic film. The three or more lenses may have respective thicknesses that define a monotonically decreasing function in a stacking direction of the stack and that include at least three different thicknesses.

The thermoplastic films of the three or more lenses may have respective thicknesses that define a monotonically decreasing function in a stacking direction of the stack and that include at least three different thicknesses. The thermoplastic film of an innermost lens of the stack may be at least twice as thick as the thermoplastic film of an outermost lens of the stack, preferably at least three times as thick.

The thermoplastic film of an innermost lens of the stack may have a thickness of five mil or greater. The thickness of the thermoplastic film of the innermost lens of the stack may be seven mil or less, preferably six mil or less.

The thermoplastic film of an outermost lens of the stack may have a thickness of three mil or less. The thickness of the thermoplastic film of the outermost lens of the stack may be two mil or greater.

The adhesive layers of the three or more lenses may have respective thicknesses that define a monotonically decreasing function in a stacking direction of the stack and that include at least three different thicknesses. The adhesive layer of an innermost lens of the stack may be at least twice as thick as the adhesive layer of an outermost lens of the stack. The adhesive layer of the innermost lens of the stack may be at least three times as thick as the adhesive layer of the outermost lens of the stack.

The thermoplastic films of the three or more lenses may have respective thicknesses that include at least two different thicknesses.

The adhesive layers of the three or more lenses may have respective thicknesses that include at least two different thicknesses.

The three or more lenses may number at least four. At least two of the lenses may have the same thickness.

A total thickness of the stack may be between ten mil and thirty mil. The total thickness of the stack may be between fifteen mil and twenty-five mil.

Another aspect of the embodiments of the present disclosure is a system. The system may comprise a vehicle windshield and a protective barrier affixed to the vehicle windshield. The protective barrier may comprise a stack of three or more lenses. Each of the three or more lenses may include a thermoplastic film (preferably a polyethylene terephthalate (PET) film or a thermoplastic polyurethane (TPU) film) and an adhesive layer on a first side of the thermoplastic film. The three or more lenses may have respective thicknesses that define a monotonically decreasing function in a stacking direction of the stack and that include at least three different thicknesses.

The vehicle windshield may be a windshield of a street vehicle.

Another aspect of the embodiments of the present disclosure is a method. The method may comprise stacking three or more lenses. Each of the three or more lenses may include a thermoplastic film (preferably a polyethylene terephthalate (PET) film or a thermoplastic polyurethane (TPU) film) and an adhesive layer on a first side of the thermoplastic film. The three or more lenses may have respective thicknesses that define a monotonically decreasing function in a stacking direction of the stack and that include at least three different thicknesses. The method may further comprise placing the stack of three or more lenses on a curved substrate with the adhesive layer of an innermost lens of the stack in contact with the curved substrate and applying heat and pressure to conform the stack of three or more lenses to the shape of the curved substrate.

The method may comprise peeling off an outermost lens of the stack of three or more lenses after said applying heat and pressure.

Another aspect of the embodiments of the present disclosure is a protective barrier affixable to a curved substrate. The protective barrier may comprise a stack of two or more lenses. Each of the two or more lenses may include a thermoplastic film (preferably a polyethylene terephthalate (PET) film or a thermoplastic polyurethane (TPU) film) and an adhesive layer on a first side of the thermoplastic film. The adhesive layers of the two or more lenses may have respective thicknesses that define a monotonically decreasing function in a stacking direction of the stack and that include at least two different thicknesses.

Another aspect of the embodiments of the present disclosure is a protective barrier affixable to a curved substrate, the protective barrier comprising a stack of one or more lenses, each of the one or more lenses including a thermoplastic polyurethane (TPU) film and an adhesive layer on a first side of the TPU film.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a protective barrier affixable to a curved substrate such as a vehicle windshield and methods of manufacture, installation, and use thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
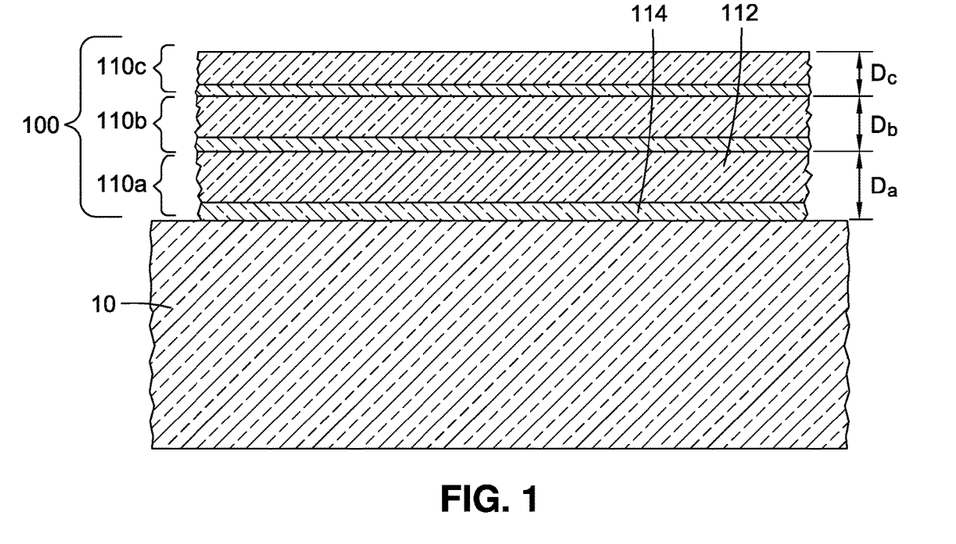
FIG. 1 is a cross-sectional view of a protective barrier according to an embodiment of the present disclosure.

FIG. 1 is a cross-sectional view of a protective barrier 100 according to an embodiment of the present disclosure. The protective barrier 100 may be affixed to a substrate 10 such as a windshield of an automobile and may comprise a stack of three or more lenses 110 (or in some cases two or more lenses 110) such as the lenses 110a, 110b, 110c shown in FIG. 1. Each of the lenses 110 may include a thermoplastic film (preferably a polyethylene terephthalate (PET) film) 112 and an adhesive layer 114 on a first side thereof for bonding the lenses 110 together and to the substrate 10. Unlike conventional stacks of tearoff films, the three or more lenses 110 may have respective thicknesses that define a monotonically decreasing function (i.e., one that either decreases or stays the same but does not increase) in a stacking direction of the stack (i.e., from a lens 110 nearest the substrate 10 toward a lens 110 farthest from the substrate 10). The respective thicknesses of the three or more lenses 110 may further include at least three different thicknesses 110 arranged accordingly, with each change in thickness thus being a decrease, resulting in thinner lenses 110 being arranged later in the stacking direction (though the stack may include adjacent lenses 110 whose respective thicknesses are the same). As shown by way of example in FIG. 1, the three illustrated lenses 110a, 110b, 110c may have respective thicknesses $D_a$, $D_b$, $D_c$ that are all different and which decrease from a first (innermost) lens 110a closest to the substrate 10 to a last (outermost) lens 110c farthest from the substrate 10, i.e., $D_a > D_b > D_c$. Owing to the described construction, as compared to conventional stacks where all layers have the same thickness, the protective barrier 100 may maintain a greater total remaining thickness as each lens 110 is removed. As a result, the peeling away of each lens 110 during the life of the protective barrier 100 does not degrade the cushioning effect of the stack as much, affording better protection of the substrate 10 against harmful impacts. At the same time, the novel construction of the protective barrier 100 makes it possible to achieve a desired performance balance by combining the cushioning effect of relatively thicker films with the reduced distortion of relatively thinner films.

Figure 2:
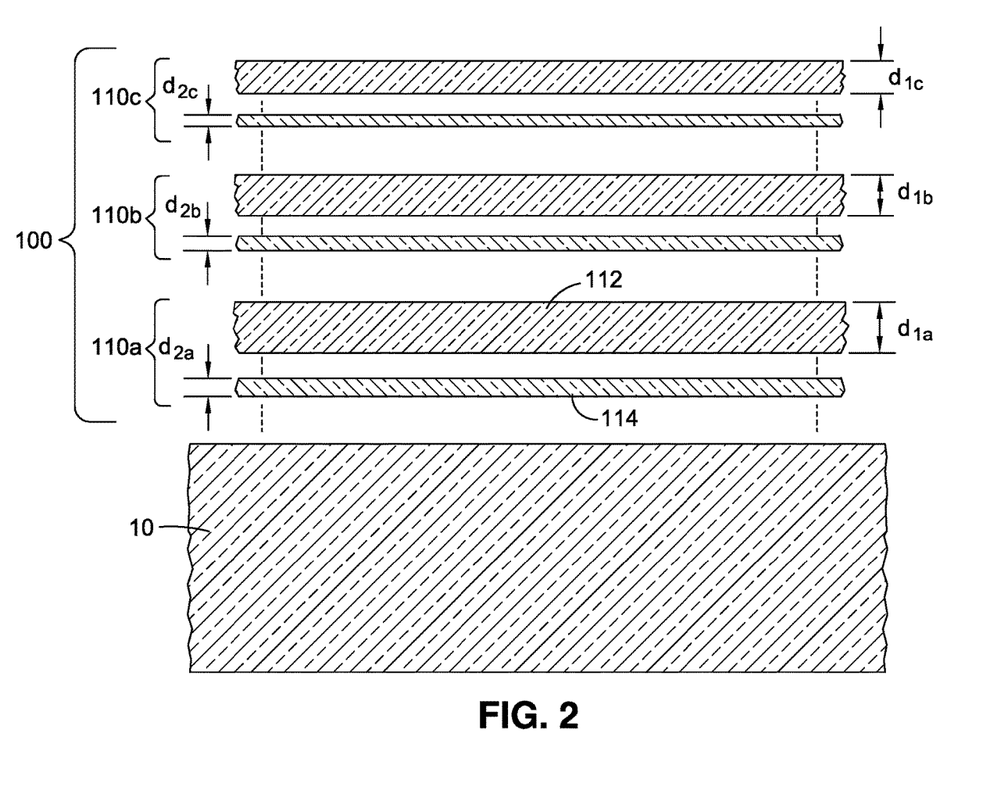
FIG. 2 is an exploded view of the protective barrier.

FIG. 2 is an exploded view of the protective barrier 100 shown in FIG. 1. In general, the different thicknesses $D_a$, $D_b$, $D_c$ may be achieved by adjusting the thickness of any sub-layer of each lens 110. Thus, in the illustrated example, where each lens 110 has a thermoplastic film 112 and an adhesive layer 114, the different thicknesses $D_a$, $D_b$, $D_c$ may be the result of varying the thickness(es) of one or both of these two layers 112, 114 in each lens 110. For the sake of example, FIGS. 1 and 2 show one such possibility in which both the thickness of the thermoplastic film 112 and the thickness of the adhesive layer 114 decrease in the stacking direction. In particular, in the illustrated example, the respective thickness of the thermoplastic films 112, identified as $d_{1a}$, $d_{1b}$, and $d_{1c}$ in FIG. 2, have the relationship $d_{1a} > d_{1b} > d_{1c}$, and the respective thicknesses of the adhesive layers, identified as $d_{2a}$, $d_{2b}$, and $d_{2c}$ in FIG. 2, likewise have the relationship $d_{2a} > d_{2b} > d_{2c}$. However, either of these relationships may, on its own, produce the relationship $D_a > D_b > D_c$, with the thicknesses of the other layer (i.e., the thicknesses of the thermoplastic films 112 or the thicknesses of the adhesive layers 114) remaining constant or having a different relationship, for example.

More generally, and accounting for embodiments in which there may be adjacent lenses 110 having the same thickness, the thermoplastic films 112 of the three or more lenses 110 may have respective thicknesses that define a monotonically decreasing function in the stacking direction. Additionally, or alternatively, the adhesive layers 114 of the three or more lenses 110 may have respective thicknesses that define a monotonically decreasing function in the stacking direction. In addition, either the respective thicknesses of the thermoplastic films 112 or the respective thicknesses of the adhesive layers 114, or both, may include at least two different thicknesses or, in some cases, three or more thicknesses. For example, one practical implementation may be to produce thermoplastic films 112 of three or more different thicknesses and to stack them so that the thermoplastic films 112 have monotonically decreasing thickness in the stacking direction, possibly keeping the thicknesses of the adhesive layers 114 constant. In such a stack, the thermoplastic film 112 of an innermost lens 110 of the stack may be at least twice as thick as the thermoplastic film 112 of an outermost lens 110 of the stack, for example, preferably at least three times as thick. Another practical implementation may be to produce thermoplastic films 112 having the same thickness but to apply differing amounts of adhesive thereto so that the adhesive layers 114 have monotonically decreasing thickness in the stacking direction. In such a stack, the adhesive layer 114 of an innermost lens 110 of the stack may be at least twice as thick as the adhesive layer 114 of an outermost lens 110 of the stack, for example, preferably at least three times as thick. Between these two extremes, the thicknesses of the thermoplastic films 112 or the thicknesses of the adhesive layers 114 may transition gradually from the thickest thermoplastic film 112 or thickest adhesive layer 114 of the innermost lens 110 to the thinnest thermoplastic film 112 or thinnest adhesive layer 114 of the outermost lens 110. Preferably, and as described in more detail below, the thicknesses of the thermoplastic films 112 or adhesive layers 114 may transition not perfectly evenly but in discrete stages in order to maximize the remaining total thickness of the stack as much as possible as each lens 110 is removed.

Figure 3:
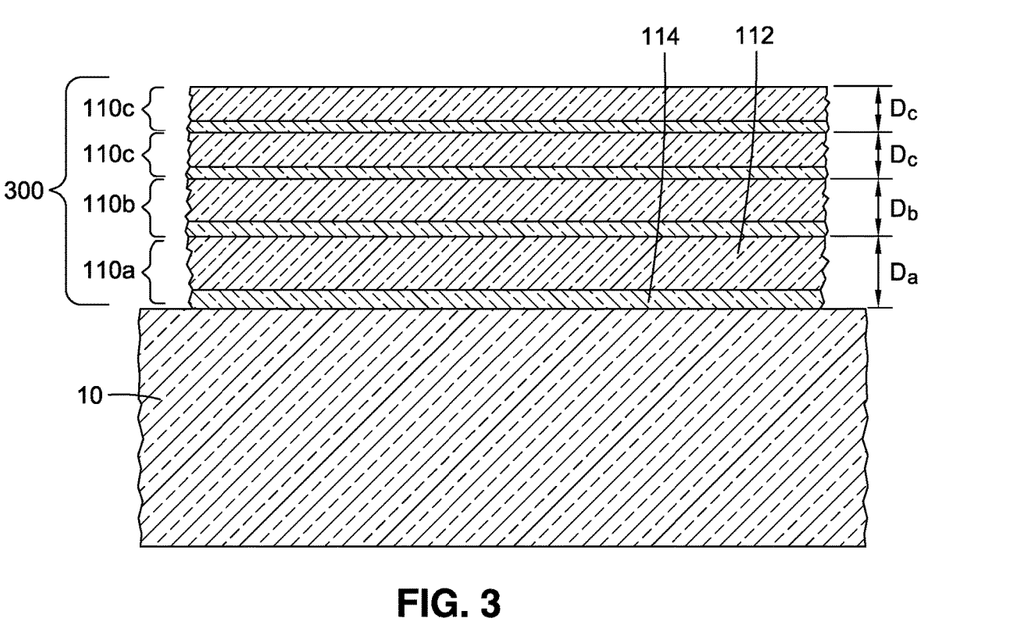
FIG. 3 is a cross-sectional view of another protective barrier according to an embodiment of the present disclosure.

FIG. 3 is a cross-sectional view of another protective barrier 300 according to an embodiment of the present disclosure. Like the protective barrier 100, the protective barrier 300 may be affixed to a substrate 10 such as a windshield of an automobile and may comprise a stack of three or more lenses 110 (or in some cases two or more lenses 110), in this case the lenses 110a, 110b, and 110c and an additional lens 110c. Each of the lenses 110 may be the same as those described in relation to FIG. 1 and may include a thermoplastic film (preferably a polyethylene terephthalate (PET) film) 112 and an adhesive layer 114 on a first side thereof for bonding the lenses 110 together and to the substrate 10. The example of the protective barrier 300 of FIG. 3 is provided in order to illustrate that the monotonically decreasing function described above may allow for adjacent lenses 110 whose respective thicknesses are the same. In this regard, FIG. 3 illustrates the specific case where the thinnest lens 110c (having thickness $D_c$) is repeated. More generally, any of the lenses 110 may be repeated any number of times within the meaning of the monotonically decreasing function contemplated herein. For example, there may be two lenses 110a, two lenses 110b, and two lenses 110c, or there may be three lenses 110a, one lens 110b, and three lenses 110c. Thus, for example, the three or more lenses 110 contemplated may number four or more, with two (or more) of the lenses having the same thickness. It should also be noted that there is no limitation on the number of differently fabricated lenses 110 having different thicknesses. That is, there may also be one or more lenses 110d with thickness $D_d$ (where $D_d<D_c$), one or more lenses 110e with thickness $D_e$ (where $D_e<D_d$), etc. Typically, however, the total number of lenses 110 may be five or less so as not to introduce too much optical distortion to the protective barrier 100.

In general, the thicknesses of the lenses 110 of the protective barriers 100, 300 contemplated herein may transition evenly from the thickest (innermost) lens 110 to the thinnest (outermost) lens 110 or may, preferably, transition in discrete stages in order to maximize the remaining total thickness of the stack as much as possible as each lens 110 is removed. As a numeric example, the following Table 1 compares the remaining stack thickness in mil as each lens 110 is removed in three hypothetical protective barriers. In each case, the starting total thickness of the stack is 20.00 mil and there are four lenses 110. Though the specific constraints on each lens's thickness may depend on the quality or strength of PET used (e.g., higher quality PET may allow for thinner thermoplastic films 112) and on the particular application (e.g., thicker thermoplastic films 112 may be usable when a higher degree of optical distortion is acceptable), it is assumed in each case that the thinnest usable thermoplastic film 112 is 2.00 mil and the thickest usable thermoplastic film 112 is 7.00 mil. (However, it is noted that stronger PET may make 1.00 mil thermoplastic films 112 possible in some cases.) For purposes of this example, it is also assumed that the thickness of the adhesive layer 114 is kept constant at 0.50 for each lens 110, with the total thickness of each lens 110 thus ranging from 2.50 mil to 7.50 mil.

TABLE 1

| Lens # | Constant Thickness | Progressive Thickness 1 | Progressive Thickness 2 |
|---|---|---|---|
| 4 (outermost) | 5.00 (20.00 left) | 2.50 (20.00 left) | 2.50 (20.00 left) |
| 3 | 5.00 (15.00 left) | 4.17 (17.50 left) | 3.00 (17.50 left) |
| 2 | 5.00 (10.00 left) | 5.83 (13.33 left) | 7.00 (14.50 left) |
| 1 (innermost) | 5.00 (5.00 left) | 7.50 (7.50 left) | 7.50 (7.50 left) |

In Table 1, the protective barrier labeled "Constant Thickness" has four equally thick lenses 110 of 5.0 mil each, while the two protective barriers labeled "Progressive Thickness 1" and "Progressive Thickness 2" exhibit monotonically decreasing thickness from the innermost lens to the outermost lens including at least three thicknesses as described herein. As can be seen from a comparison between the different hypothetical protective barriers in Table 1, the total remaining thickness in the "Progressive Thickness 1" and "Progressive Thickness 2" examples is significantly greater than that in the "Constant Thickness" example as each lens 110 is removed, such that the remaining stack provides a superior cushioning effect to withstand impacts. For example, after the outermost lens (lens number 4) is removed, the "Constant Thickness" stack has gone from a total thickness of 20.00 mil down to a total thickness of 15.00 mil, while the two "Progressive Thickness" examples have only dropped to a total thickness of 17.50 mil. The "Progressive Thickness" examples continue to preserve more total thickness as the lenses 110 are removed. The monotonic decrease in thickness of "Progressive Thickness 1" represents an even transition in which the change in thickness is constant from one lens 110 to the next, while the monotonic decrease in thickness of "Progressive Thickness 2" represents an uneven transition marked by discrete stages, such that there is a stage of relatively thin lenses 110 on the outermost part of the stack (2.50 mil and 3.00 mil) and a stage of relatively thick lenses 110 on the innermost part of the stack (7.00 mil and 7.50 mil). By arranging the thicknesses of the lenses 110 in this way, the remaining thickness as each lens 110 is removed can be further optimized. As can be seen, for example, "Progressive Thickness 2" retains 14.50 mil total thickness after the second lens 110 is removed, while "Progressive Thickness 1" retains only 13.33 mil total thickness (though this is still far superior to the 10.00 mil total thickness retained by the "Constant Thickness" example). In this way, an uneven transition between the thickest and thinnest lenses 110 may result in a greater total thickness remaining after each lens 110 is removed, further optimizing the protective barrier 100 for protection against impacts during use.

In the above examples described in relation to Table 1, the thicknesses of the adhesive layers 114 are assumed to be kept constant at 0.50 mil, with the thicknesses of the thermoplastic films 112 being 4.50 mil in the "Constant Thickness" example and transitioning from 7.00 mil to 2.00 mil in the two examples of progressive thickness ("Progressive Thickness 1" and "Progressive Thickness 2"). In general, when implementing the disclosed monotonic decrease in thickness, it is contemplated that the thermoplastic film 112 of the innermost lens 110 of the stack, as well as the thermoplastic films 112 of those lenses 110 nearest it, may preferably be relatively thick (e.g., five mil or greater) so that the greatest portion of the total thickness of the protective layer 100 is concentrated at the innermost part of the stack. At the same time, the thickness of this innermost thermoplastic film 112 preferably does not exceed seven mil (and more preferably does not exceed six mil) in order to keep the degree of optical distortion within a range that is suitable for a windshield use case. As for the thermoplastic film 112 of the outermost lens 110 of the stack and those lenses 110 nearest it, the thickness is preferably three mil or less so that the first lenses 110 that are removed from the stack do not significantly reduce the total thickness of the stack. At the same time, the thickness of the outermost thermoplastic film 112 (i.e., the minimum film thickness) is typically at least two mil or greater so that it is strong enough to withstand the forces associated with the user peeling lenses 110 from the stack during use. It is noted, however, that since the outermost thermoplastic film 112 does not need to undergo the pulling force of any previous (i.e., higher) adhesive layer, the thermoplastic film 112 of the outermost lens 110 may in some cases be significantly thinner than the thermoplastic film 112 of the lens 110 underneath it.

As noted above, the different thicknesses $D_a$, $D_b$, $D_c$ may be achieved by adjusting the thickness of any sub-layer of each lens 110, including the adhesive layers 114. In this regard, the thickness of the adhesive layer 114 may typically be varied between a minimum thickness that is 0.050 mil or greater and a maximum thickness that is 2.00 mil or less, for example.

Figure 4:
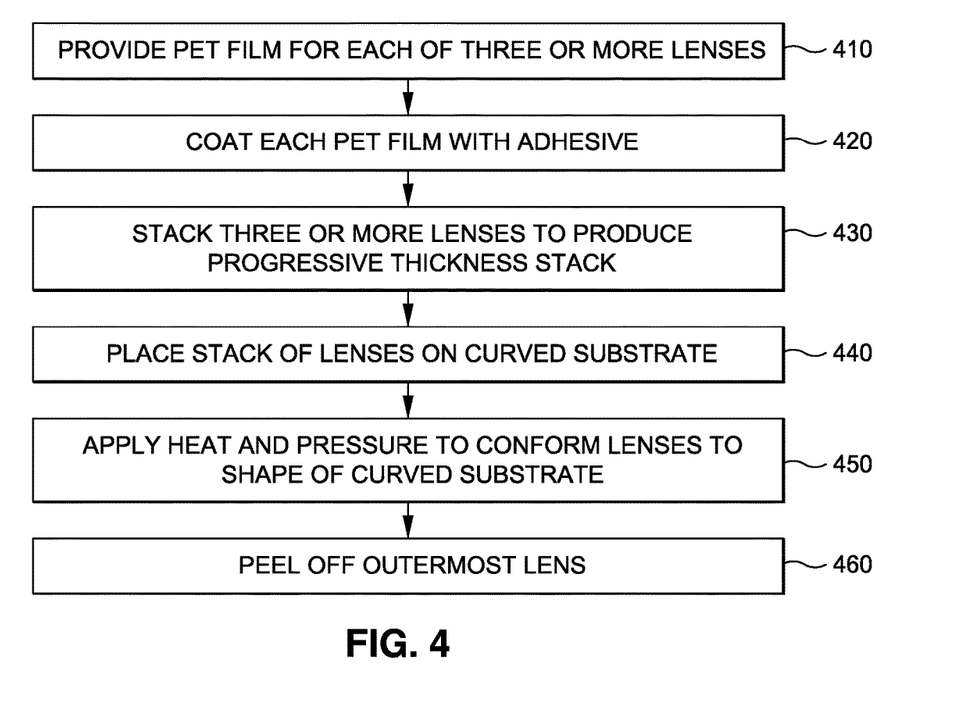
FIG. 4 is an example operational flow according to an embodiment of the present disclosure.

FIG. 4 is an example operational flow according to an embodiment of the present disclosure. The operational flow of FIG. 4 may serve as an example method of manufacturing, installing, and using the protective barrier 100, 300 including the stack of lenses 110 shown and described in relation to FIGS. 1-3. The operational flow may begin with providing the thermoplastic film 112 to be used in each of three or more lenses 110 (step 410). The thermoplastic film 112 of each of the lenses 110 may be a biaxially-oriented polyethelene terephthalate (BoPET) and may be selected for particular MTF data or may be fabricated while actively monitoring the MTF data in a continuous or batch-to-batch process as described in any of U.S. Patent Application Pub. No. 2021/0162645, entitled "Method and Apparatus for Reducing Non-Normal Incidence Distortion in Glazing Films," U.S. Patent Application Pub. No. 2021/0283994, entitled "Protective Barrier for Safety Glazing," or commonly owned U.S. patent application Ser. No. 17/505,433, entitled "Method and Apparatus for Reducing Non-Normal Incidence Distortion in Glazing Films," the entire contents of each of which is incorporated by reference herein. In this regard, providing the thermoplastic film 112 may include, for example, melting a resin, extruding the melted resin through a die to produce a polymer film, and cooling the polymer film. Each thermoplastic film 112 may be coated on one side thereof with an adhesive layer 114 (step 420), which is preferably wet deposited but may be applied according to any appropriate methods including spin coating, dip coating, or vacuum deposition. The adhesive layer 114 may be a wet mount adhesive as disclosed, for example, in U.S. Pat. No. 9,128,545, entitled "Touch Screen Shield" or a dry mount adhesive as disclosed, for example, in U.S. Pat. No. 9,295,297, entitled "Adhesive Mountable Stack of Removable Layers," the entire contents of each of which is incorporated by reference herein. The adhesive 114 may be an acrylic or silicon adhesive such as an acrylic pressure sensitive adhesive (PSA) or a silicon PSA.

With the thermoplastic films 112 having been coated with the adhesive layers 114, the operational flow of FIG. 4 may continue with stacking three or more of the resulting lenses 110 to produce a progressive thickness stack (step 430). For example, as described above, either the thickness of the thermoplastic films 112, the thickness of the adhesive layers 114, or both may be varied according to a monotonically decreasing function from an innermost lens 110 to an outermost lens 110, such that the thickness of each lens 110 is either less than or equal to that of the previous lens 110 in the stacking direction. In addition to the thermoplastic film 112 and adhesive layer 114, it is contemplated that each lens 110 may further include other layers, such as a hard coat as described in the above-mentioned '994 publication, a UV blocking layer, or a thermochromic film as described in U.S. Patent Application Pub. No. 2021/0070017, entitled "Nano Particle Solar Control Film," the entire contents of which is incorporated by reference herein. The thicknesses of any such additional layers may likewise be controlled in order to maintain the monotonically decreasing thickness described herein. The total thickness of the stack of lenses 110 may preferably be between ten mil and thirty mil, more preferably between fifteen mil and twenty-five mil (e.g., twenty mil as in the above examples of Table 1). In order to keep optical distortion as low as possible, the refractive indices of the thermoplastic films 112, the adhesive layers 114, and any other layers within each lens 110 and between each of the plurality of lenses 110 may be matched to within 0.2 as described in the above-mentioned '297 patent.

Once the protective barrier 100 comprising the stack of lenses 110 has been assembled, the operational flow may continue with installing the protective barrier 100 on a curved substrate 10 such as the windshield of a car or other vehicle. Continuing to refer to the operational flow of FIG. 4, the protective barrier 100, including the stack of lenses 110, may be placed on the windshield or other curved substrate 10 (step 440), with the adhesive layer 114 of the lowermost lens 110a (see FIGS. 1-3) in contact with the curved substrate 10. For easier installation, the protective barrier 100 may be rough cut (e.g. using an electric film cutter) so as not to extend too far outside the windshield 10. The operational flow may continue with applying heat and pressure to conform the stack of three or more lenses 110 to the shape of the curved substrate 10 (step 450). In particular, the applying of heat and pressure may be performed at least in part prior to the adhesive layer 114 of each of the three or more lenses 110 being fully cured, for example, prior to the adhesive layer 114 exceeding a peel strength of 25 grams per inch determined as a constant load per unit width needed for peeling. The protective barrier 100 may be completely conformed to the shape of the curved substrate 10 prior to the adhesive layers 114 being fully cured. In some cases, the protective barrier 100 may be applied to the substrate 10 using a sacrificial layer serving as a female mold cavity to sandwich the stack of lenses 110 between the sacrificial layer and the substrate 10 as described in U.S. Patent Application Pub. No. 2020/0247102, entitled "Thermoform Windshield Stack with Integrated Formable Mold," the entire contents of which is incorporated by reference herein. After allowing the protective barrier 100 to cool down, the installation may conclude with performing a final trim to fit the windshield or other substrate 10.

As explained above, it is contemplated that a protective barrier 100 having more than one lens 110 may allow for the outermost lens 110 to be peeled off and removed to reveal the unused surface of the lens 110 beneath. In this respect, the operational flow of FIG. 4 may continue during the life of the protective barrier 100 that has been installed on a vehicle windshield or other substrate 10. When the outermost lens 110 becomes unacceptably degraded over time (e.g. after six months, after a year, after scratching from wiper blades begins to occur, etc.), it may be peeled off to reveal the next lens 110 underneath (step 460). The timing of peeling off the outermost lens 110 may depend on the particular climate where the protective barrier 100 is used, with some climates entailing more exposure to sun and others requiring more frequent use of wiper blades, for example. Owing to the progressive thickness of the stack of lenses 110, the total thickness of the protective barrier 100 may remain significantly greater than a conventional stack of tearoff lenses after the removal of the outermost lens 110, resulting in a longer lasting cushioning effect against impacts during the life of the protective barrier 100.

In the above disclosure, it is noted that PET (e.g., BoPET) may be a preferred thermoplastic film 112. However, the material of the thermoplastic film 112 is not necessarily limited in this respect. For example, the thermoplastic film 112 of any or all of the lenses 110 may instead be a thermoplastic polyurethane (TPU) film, such as an optically clear TPU film. The TPU film may be manufactured to have a visible light transmittance (VLT) of greater than 85% (e.g., 90-95%) while having a low haze (e.g., 1% or lower). The TPU film may be greater than 2 mils, for example. Advantageously, the use of TPU for the thermoplastic film 112 of the protective barrier 100 may allow for a quicker installation process, requiring less expertise on the part of the installer, as compared to when PET is used. This is due to TPU's ease of applicability on 2D or 3D curved surfaces, without there being the need to apply heat to thermoform the film or the stack, or with only the need to apply very little heat to thermoform the TPU in seconds when the film is to be installed. In particular, TPU is more stretchable than PET and also requires less heat to become increasingly more stretchable. Common issues, such as fingering (i.e., imperfect application resulting in finger-shaped bubbles underneath the film), that occur when installing a PET-based stack require a specific thermoforming technique to avoid and/or correct. Correcting these imperfections itself is a lengthy process, resulting in longer installation time by a professional. In contrast, TPU with strong elasticity and elongation properties doesn't require as much technique and in some cases may not require any professional technique.

As a result of the above advantages, the use of TPU for the thermoplastic film(s) 112 may allow for a significantly lower installation cost than that of PET-based thermoplastic film(s) 112, resulting in a highly affordable product. Such an affordable product is especially important as a protective barrier for the underlying windshield as windshields become increasing costly due to Advanced Driver Assistance Systems (ADAS) technology, the increased windshield curvature of new car designs, and the larger windshield size of new car designs. It is also contemplated that TPU-based films 112, with or without a protective hard coat, may last longer than PET-based films 112. As such, the use of TPU in the disclosed embodiments (as well as for protective films in general, even single-layer stacks as described below) may result in a lower cost film, a significantly shorter installation time (e.g., one-fifth the installation time), a longer lifetime, and a lower cost per windshield per year (e.g., one-tenth of the cost in the case of PET-based protective films) as the underlying windshields are protected from breaking, cracking, or pitting.

Furthermore, when a windshield is replaced in the U.S., even if it can be recycled by being sent to a third-party recycling company, over 95% of the time the old windshield is not recycled. The vast majority of the estimated 15 million windshields damaged are being dumped in landfills each year in the U.S. alone, resulting in massive pollution. See Wölfel B, Seefried A, Allen V, Kaschta J, Holmes C, Schubert D W. *Recycling and Reprocessing of Thermoplastic Polyurethane Materials towards Nonwoven Processing.* Polymers. 2020; 12(9):1917. https://doi.org/10.3390/polym12091917. By using a stack of one or more protective TPU films, a significant portion of this waste can be avoided. Meanwhile, the TPU itself can be easily recycled and is a 100% recyclable and biodegradable material. It is an advanced material much more environmentally friendly than alternatives such as PVC since TPU is recyclable and biodegradable in three to five years, in comparison to glass windshield material that may take hundreds of thousands of years to decompose in the landfill assuming it decomposes at all.

Advantageously, it is contemplated that TPU-based films 112 may replace PET-based films 112 in the disclosed protective barrier 100 as described above. However, the above disclosure regarding the advantages of using TPU-based films 112 is not intended to be limited only to use in the protective barrier 100 described herein. TPU-based films 112 may, for example, be used in other multi-layer stacks of lenses 110 or in single-layer stacks of one lens 110. A contemplated single-layer stack of one lens 110 may include, for example, the TPU film 112 and the adhesive layer 114 for bonding the lens 110 to the substrate 10, as well as optionally a hard coat, a UV blocking layer, a thermochromic film, etc. as described above.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A protective barrier affixable to a curved substrate, the protective barrier comprising a stack of four or more lenses, each of the four or more lenses including a thermoplastic film and an adhesive layer on a first side of the thermoplastic film, the four or more lenses having respective thicknesses that define a monotonically decreasing function in a stacking direction of the stack and that include at least three different thicknesses, wherein a difference in thickness between adjacent lenses of the stack is not constant.

2. The protective barrier of claim 1, wherein the thermoplastic films of the four or more lenses have respective thicknesses that define a monotonically decreasing function in a stacking direction of the stack and that include at least three different thicknesses.

3. The protective barrier of claim 2, wherein the thermoplastic film of the innermost lens of the stack is at least twice as thick as the thermoplastic film of the outermost lens of the stack.

4. The protective barrier of claim 1, wherein the thermoplastic film of the innermost lens of the stack has a thickness of five mil or greater.

5. The protective barrier of claim 4, wherein the thickness of the thermoplastic film of the innermost lens of the stack is seven mil or less.

6. The protective barrier of claim 1, wherein the thermoplastic film of the outermost lens of the stack has a thickness of three mil or less.

7. The protective barrier of claim 6, wherein the thickness of the thermoplastic film of the outermost lens of the stack is two mil or greater.

8. The protective barrier of claim 1, wherein the adhesive layers of the four or more lenses have respective thicknesses that define a monotonically decreasing function in a stacking direction of the stack and that include at least three different thicknesses.

9. The protective barrier of claim 8, wherein the adhesive layer of the innermost lens of the stack is at least twice as thick as the adhesive layer of the outermost lens of the stack.

10. The protective barrier of claim 9, wherein the adhesive layer of the innermost lens of the stack is at least three times as thick as the adhesive layer of the outermost lens of the stack.

11. The protective barrier of claim 1, wherein the thermoplastic films of the four or more lenses have respective thicknesses that include at least two different thicknesses.

12. The protective barrier of claim 1, wherein the adhesive layers of the four or more lenses have respective thicknesses that include at least two different thicknesses.

13. The protective barrier of claim 1, wherein at least two of the lenses have the same thickness.

14. The protective barrier of claim 1, wherein a total thickness of the stack is between ten mil and thirty mil.

15. The protective barrier of claim 14, wherein the total thickness of the stack is between fifteen mil and twenty-five mil.

16. The protective barrier of claim 1, wherein the thermoplastic film of each of the four or more lenses is a polyethylene terephthalate (PET) film.

17. The protective barrier of claim 1, wherein the thermoplastic film of each of the four or more lenses is a thermoplastic polyurethane (TPU) film.

18. A method comprising:
providing the protective barrier of claim 1;
placing the stack of four or more lenses on a curved substrate with the adhesive layer of the innermost lens of the stack in contact with the curved substrate; and
applying heat and pressure to conform the stack of four or more lenses to the shape of the curved substrate.

19. The method of claim 18, further comprising peeling off the outermost lens of the stack of four or more lenses after said applying heat and pressure.

20. The method of claim 18, wherein the thermoplastic film of each of the four or more lenses is a polyethylene terephthalate (PET) film.

21. The method of claim 18, wherein the thermoplastic film of each of the four or more lenses is a thermoplastic polyurethane (TPU) film.

22. A system comprising:
a vehicle windshield; and
a protective barrier affixed to the vehicle windshield, the protective barrier comprising a stack of four or more lenses, each of the four or more lenses including a thermoplastic film and an adhesive layer on a first side of the thermoplastic film, the four or more lenses having respective thicknesses that define a monotonically decreasing function in a stacking direction of the stack and that include at least three different thicknesses, wherein a difference in thickness between adjacent lenses of the stack is not constant.

23. The system of claim 22, wherein the vehicle windshield is a windshield of a street vehicle.

24. The system of claim 22, wherein the thermoplastic film of each of the four or more lenses is a polyethylene terephthalate (PET) film.

25. The system of claim 22, wherein the thermoplastic film of each of the four or more lenses is a thermoplastic polyurethane (TPU) film.

26. A protective barrier affixable to a curved substrate, the protective barrier comprising a stack of four or more lenses, each of the four or more lenses including a thermoplastic film and an adhesive layer on a first side of the thermoplastic film, the thermoplastic films of the four or more lenses having respective thicknesses that define a monotonically decreasing function in a stacking direction of the stack and that include at least three different thicknesses, wherein a difference in thickness between the thermoplastic films of adjacent lenses of the stack is not constant.

27. The protective barrier of claim 26, wherein the thermoplastic films of at least two of the lenses have the same thickness.

28. A protective barrier affixable to a curved substrate, the protective barrier comprising a stack of four or more lenses, each of the four or more lenses including a thermoplastic film and an adhesive layer on a first side of the thermoplastic film, the adhesive layers of the four or more lenses having respective thicknesses that define a monotonically decreasing function in a stacking direction of the stack and that include at least three different thicknesses, wherein a difference in thickness between the adhesive layers of adjacent lenses of the stack is not constant.

29. The protective barrier of claim 28, wherein the adhesive layers of at least two of the lenses have the same thickness.

30. A system comprising:
a vehicle windshield; and
a protective barrier affixed to the vehicle windshield, the protective barrier comprising a stack of four or more lenses, each of the four or more lenses including a thermoplastic film and an adhesive layer on a first side of the thermoplastic film, the thermoplastic films of the four or more lenses having respective thicknesses that define a monotonically decreasing function in a stacking direction of the stack and that include at least three different thicknesses, wherein a difference in thickness between the thermoplastic films of adjacent lenses of the stack is not constant.

* * * * *